US012338335B2

(12) United States Patent
Yan et al.

(10) Patent No.: US 12,338,335 B2
(45) Date of Patent: Jun. 24, 2025

(54) POLYAMIDE FOAM PREPARATION

(71) Applicant: Dow Global Technologies LLC, Midland, MI (US)

(72) Inventors: Jinliang Yan, Shanghai (CN); Richard Tien Hua Chou, Hockessin, DE (US); Karlheinz Hausmann, Horgen (CH); Zhongyu Wang, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 1008 days.

(21) Appl. No.: 17/276,897

(22) PCT Filed: Sep. 28, 2018

(86) PCT No.: PCT/CN2018/108300
§ 371 (c)(1),
(2) Date: Mar. 17, 2021

(87) PCT Pub. No.: WO2020/062018
PCT Pub. Date: Apr. 2, 2020

(65) Prior Publication Data
US 2021/0380775 A1    Dec. 9, 2021

(51) Int. Cl.
*C08J 9/12* (2006.01)
*C08F 8/44* (2006.01)
*C08F 220/06* (2006.01)
*C08F 222/06* (2006.01)
*C08J 9/00* (2006.01)

(52) U.S. Cl.
CPC ............. *C08J 9/0061* (2013.01); *C08F 8/44* (2013.01); *C08F 220/06* (2013.01); *C08F 222/06* (2013.01); *C08J 9/122* (2013.01); *C08J 2201/03* (2013.01); *C08J 2203/06* (2013.01); *C08J 2203/08* (2013.01); *C08J 2323/08* (2013.01); *C08J 2333/02* (2013.01); *C08J 2377/02* (2013.01)

(58) Field of Classification Search
CPC ............. C08J 2377/02; C08J 2333/02; C08J 2323/08; C08J 2203/08; C08J 2203/06; C08J 2201/03; C08J 9/0061; C08J 9/122; C08J 9/12–127; C08F 222/06; C08F 220/06; C08F 8/44
See application file for complete search history.

(56) References Cited

U.S. PATENT DOCUMENTS

| 3,264,272 | A | 8/1966 | Watkin | |
|---|---|---|---|---|
| 3,728,292 | A | 4/1973 | McGarth et al. | |
| 5,700,890 | A | 12/1997 | Chou | |
| 5,859,137 | A * | 1/1999 | Chou | C08L 23/08 526/272 |
| 6,284,810 | B1 * | 9/2001 | Burnham | B29C 48/06 264/45.9 |
| 6,399,667 | B1 * | 6/2002 | Nodono | B29C 44/348 264/45.9 |
| 6,436,521 | B1 | 8/2002 | Lee | |
| 7,365,116 | B2 | 4/2008 | Chen | |
| 7,592,056 | B2 | 9/2009 | Reynoso Gomez | |
| 7,994,231 | B2 | 8/2011 | Jacobs et al. | |
| 8,906,479 | B2 | 12/2014 | Chou et al. | |
| 2001/0041770 | A1 | 11/2001 | Di-Benedetto et al. | |
| 2006/0063888 | A1 * | 3/2006 | Dean | A61L 15/24 521/142 |
| 2008/0161503 | A1 | 7/2008 | Chou et al. | |
| 2011/0020573 | A1 | 1/2011 | Chou et al. | |
| 2012/0065282 | A1 | 3/2012 | Trouillet-Fonti et al. | |
| 2012/0202940 | A1 | 8/2012 | Hausmann et al. | |
| 2013/0172104 | A1 | 7/2013 | Kennedy, III | |

FOREIGN PATENT DOCUMENTS

| AU | 2003255684 A1 | 1/2004 |
|---|---|---|
| CN | 105482101 A | 4/2016 |
| CN | 105601977 A | 5/2016 |
| FR | 3062653 | 8/2018 |
| JP | 55125127 A | 9/1980 |
| JP | H05209079 A * | 8/1993 |
| WO | 98/38227 A1 | 9/1998 |
| WO | 2004113445 A1 | 12/2004 |
| WO | 2013101961 A1 | 7/2013 |
| WO | 2017000162 A1 | 1/2017 |
| WO | 2017/086289 A1 | 8/2018 |

OTHER PUBLICATIONS

Martinache, J. et al. Processing of Polyamide 11 with Supercritical Carbon Dioxide. Ind. Eng. Chem. Res. 2001, 40, 5570-5577 (Year: 2001).*
Machine translation of description of JP H05209079 by Hirai et al. (Year: 1993).*
Extended Search Report dated Apr. 12, 2022, pertaining to EP Patent Application No. 18935333.7, 7 pgs.
Mori et al. "Foam processing of polyethylene ionomers with supercritical CO2" Composites: Part A 40 (2009) 1708-1716, 9 pgs.
Japanese Office Action dated Oct. 11, 2022 for Japanese Patent Application No. 2021-515215—3 total pages.
International Search Report and Written Opinion pertaining to PCT/CN2018/108300, dated Jun. 27, 2019.
Praller, A., "Foaming Plastics with Inert Gases", Kunststoffe Plast Europe, 2005, Carl Hanser Verlag, Munich.
The Linde Group, "Facts About. Foaming Plastics with Inert Gases", Brochure, www.lindeplastics.com.

(Continued)

*Primary Examiner* — Christina H. W. Rosebach
(74) *Attorney, Agent, or Firm* — Dinsmore & Shohl, LLP

(57) ABSTRACT

Disclosed herein is a foamed composition comprising 55 to 98 wt. % of polyamide, and 2 to 45 wt. % of ionomer comprising a zinc neutralized ethylene acid copolymer. The zinc neutralized ethylene acid copolymer is the polymerized reaction product of ethylene monomer, monocarboxylic acid monomer, and unsaturated dicarboxylic acid monomer, and 30 to 70 mole percent of total acid units of the ionomer are neutralized.

19 Claims, No Drawings

(56) References Cited

OTHER PUBLICATIONS

Brazil Office Action dated Nov. 7, 2023, pertaining to BR Patent Application No. BR112021005395-6, 3 pgs.
Europe Examination Report dated Nov. 15, 2023, pertaining to EP Patent Application No. 18935333.7, 4 pgs.

* cited by examiner

POLYAMIDE FOAM PREPARATION

TECHNICAL FIELD

Embodiments of the present disclosure generally relate to foam materials and more specifically relate to foams comprising a blend of polyamide and ionomers.

BACKGROUND

Foams continue to be products of significant interest because of their suitability in various industrial applications. One such foam of interest is polyamide foams; however, the melt viscosity for polyamides is generally too low for foaming applications. Accordingly, there is a continual need for improved polyamide foams having improved melt viscosity.

SUMMARY

Embodiments of the present disclosure address this need by blending polyamides with ionomers to increase the melt viscosity.

According to one foam embodiment, the foam comprises 55 to 98 wt. % polyamide, and 2 to 45 wt. % of ionomer comprising a zinc neutralized ethylene acid copolymer. The zinc neutralized ethylene acid copolymer is the polymerized reaction product of ethylene monomer, monocarboxylic acid monomer, and unsaturated dicarboxylic acid monomer. Moreover, 30 to 70 mole percent of total acid units of the ionomer are neutralized.

According to another embodiment, a method of producing foam comprises injecting supercritical blowing agent of $CO_2$, $N_2$ or a combination of both into a vessel to mix with a foam precursor mixture, wherein the vessel is at a pressure and temperature above the supercritical temperature and pressure of the blowing agent, and wherein the foam precursor mixture comprises 55 to 98 wt. % polyamide; and 2 to 45 wt. % of ionomer comprising a zinc neutralized ethylene acid copolymer. The zinc neutralized ethylene acid copolymer is the polymerized reaction product of ethylene monomer, monocarboxylic acid monomer, and unsaturated dicarboxylic acid monomer, and 30 to 70 mole percent of total acid units of the ionomer are neutralized. Finally, the method comprises producing the foam by dropping the pressure below the pressure of the supercritical blowing agent.

DETAILED DESCRIPTION

Unless otherwise defined, all technical and scientific terms used herein have the same meaning as commonly understood by one of ordinary skill in the art to which this disclosure belongs. In case of conflict, the specification, including definitions, will control.

Although methods and materials similar or equivalent to those described herein can be used in the practice or testing of various embodiments, suitable methods and materials are described herein.

Unless stated otherwise, all percentages, parts, ratios, etc., are by weight. When an amount, concentration, or other value or parameter is given as either a range, preferred range, or a list of lower preferable values and upper preferable values, this is to be understood as specifically disclosing all ranges formed from any pair of any lower range limit or preferred value and any upper range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

When the term "about" is used in describing a value or an end-point of a range, the disclosure should be understood to include the specific value or end-point referred to.

As used herein, the terms "comprises," "comprising," "includes," "including," "containing," "characterized by," "has," "having," or any other variation thereof, are intended to cover a non-exclusive inclusion. For example, a process, method, article, or apparatus that comprises a list of elements is not necessarily limited to those elements but may include other elements not expressly listed or inherent to such process, method, article, or apparatus. Further, unless expressly stated to the contrary, "or" refers to an inclusive or and not to an exclusive or.

The transitional phrase "consisting essentially of" limits the scope of a claim to the specified materials or steps and those that do not materially affect the basic and novel characteristic(s) of the disclosure. Where applicants have defined an embodiment or a portion thereof with an open-ended term such as "comprising," unless otherwise stated, the description should be interpreted to also describe such an embodiment using the term "consisting essentially of."

Use of "a" or "an" are employed to describe elements and components of various embodiments. This is merely for convenience and to give a general sense of the various embodiments. This description should be read to include one or at least one and the singular also includes the plural unless it is obvious that it is meant otherwise.

When materials, methods, or machinery are described herein with the term "known to those of skill in the art", "conventional" or a synonymous word or phrase, the term signifies that materials, methods, and machinery that are conventional at the time of filing the present application are encompassed by this description.

The term "polymer" refers to a polymeric compound prepared by polymerizing monomers, whether of the same or a different type. The generic term polymer thus embraces the terms "homopolymer" and "copolymer." The term "homopolymer" refers to polymers prepared from only one type of monomer; the term "copolymer" refers to polymers prepared from two or more different monomers, and for the purpose of this disclosure may include "terpolymers" and "interpolymer."

The term "monocarboxylic acid monomer" means a molecule having a reactive portion, such as a vinyl or vinylene, that may bond to other monomers to form a polymer and a carboxylic acid (—C(O)OH) moiety that is not included in the reactive portion. For example, (meth)acrylic acid is a monocarboxylic acid monomer, in which the vinylene is the reactive portion and there is a carboxylic acid. The term "(meth)acrylic acid" includes methacrylic acid and/or acrylic acid and "(meth)acrylate" includes methacrylate, acrylate, or combinations of methacrylate and acrylate.

The term "unsaturated dicarboxylic acid monomer" as used in this disclosure means a molecule having a reactive portion, such as a vinyl or vinylene, that may bond to other monomers to form a polymer and two carboxylic acid (—C(O)OH) groups that are not included in the reactive portion. Additionally, "unsaturated dicarboxylic acid monomer" includes unsaturated dicarboxylic acid derivative monomers (half esters and anhydrides).

As used herein, "melt viscosity" may also be considered shear viscosity, which is a polymer composition's resistance to shear flow. The present disclosure reports shear viscosity data at a shear rate of 100 radians/sec; however, other shear rates are contemplated within the capillary rheometer.

Embodiments of the present disclosure are directed to foams having increased melt viscosity by blending polyamide with ionomer. According to one embodiment of the present foam, the foam comprises 55 to 98 wt. % polyamide, and 2 to 45 wt. % of ionomer. The ionomer comprises a zinc neutralized ethylene acid copolymer, which is the polymerized reaction product of ethylene monomer, monocarboxylic acid monomer, and unsaturated dicarboxylic acid monomer. Moreover, 30 to 70 mole percent of total acid units of the ionomer are neutralized.

Polyamide

Various compositions are contemplated for the polyamide, for example, aliphatic or aromatic polyamide. In one or more embodiments, the polyamide is an aliphatic polyamide of chosen among the group of polyamides obtainable from lactams or amino acids (e.g., polyepsiloncaprolactam (PA6) or PA11), or from condensation of diamines such as hexamethylene diamine with dibasic acids such as succinic, adipic, or sebacic acid. Copolymers and terpolymers of these polyamides are also included. In other embodiments, the aliphatic polyamide may be chosen among polyepsiloncaprolactam (PA6); polyhexamethylene adipamide (PA6,6); PA11; PA12; PA12,12 and copolymers and terpolymers such as PA6/6,6; PA 6,10; PA6,12; PA6,6/12; PA6/6,6/6,10 and PA6/6T. In specific embodiments, the polyamide may comprise PA 6, PA 12, or combinations thereof. It is contemplated that the foam may comprise multiple polyamides from the list above. In a further embodiment, the foam may be free of polyurethane.

Prior to blending with the ionomer, the density of the polyamide may be greater than 1.0 g/cc, or greater than 1.1 g/cc. Said another way, the density of the polyamide foam may be from 1.0 g/cc to 1.5 g/cc, or from 1.1 to 1.2 g/cc, prior to blending with the ionomer.

Various amounts of the polyamide are contemplated within the foam. For example, the foam may comprise 55 to 98 wt. % polyamide, from 60 to 97 wt. % polyamide, from 75 to 97 wt. % polyamide, or from or from 80 to 90 wt. % polyamide.

Ionomers

To increase the melt shear viscosity, the polyamide is blended with the ionomer, which as stated above comprises zinc neutralized ethylene acid copolymer. Various amounts of the ionomer are contemplated. In one or more embodiments, the foam comprises 2 to 45 wt. % of ionomer, from 3 to 20 wt. % ionomer, or from 10 to 20 wt. % ionomer.

As stated previously, the zinc neutralized ethylene acid copolymer may be a terpolymer product of ethylene monomer, monocarboxylic acid monomer, and unsaturated dicarboxylic acid monomer. The zinc neutralized ethylene acid copolymer may comprise at least 50% ethylene monomer, based on the total wt. % of the monomers present in the zinc neutralized ethylene acid copolymer. In further embodiments, the zinc neutralized ethylene acid copolymer comprises at least 60% ethylene monomer, at least 70% ethylene monomer, or at least 80% ethylene monomer.

Further, the zinc neutralized ethylene acid copolymer may comprise at least 5 to 25 wt. % of monocarboxylic acid monomer, based on the total wt. % of the monomers present in the zinc neutralized ethylene acid copolymer. In further embodiments, the zinc neutralized ethylene acid copolymer comprises 8 to 20 wt. % of monocarboxylic acid monomer, or 10 to 15 wt. % of monocarboxylic acid monomer. The monocarboxylic acid monomer may comprise methacrylic acid, acrylic acid, or combinations thereof. In a specific embodiment, the monocarboxylic acid monomer comprises methacrylic acid.

Additionally, the zinc neutralized ethylene acid copolymer comprises 2 to 20 wt. % of unsaturated dicarboxylic acid monomer, based on the total wt. % of the monomers present in the zinc neutralized ethylene acid copolymer. In further embodiments, the zinc neutralized ethylene acid copolymer comprises 3 to 15 wt. % of unsaturated dicarboxylic acid monomer, or 5 to 10 wt. % of unsaturated dicarboxylic acid monomer. The unsaturated dicarboxylic acid monomer may comprise maleic anhydride, maleic anhydride mono-methyl ester, maleic anhydride mono-ethyl ester, maleic anhydride mono-propyl ester, maleic anhydride mono-butyl ester, or combinations thereof. In a specific embodiment, the monocarboxylic acid monomer comprises maleic anhydride mono-methyl ester.

The carboxylic acid functionalities present in the ionomer are at least partially neutralized by zinc and optionally one or more alkali metal, transition metal, or alkaline earth metal cations such as for example from sodium, lithium, magnesium, and calcium. The carboxylic acid functionalities can be neutralized at least partially from 30 to 70 mol. %, or from 40 to 60 mol. %. The ionomers of the present disclosure may be prepared by standard neutralization techniques, as disclosed in U.S. Pat. No. 3,264,272 (Rees), which is hereby incorporated by reference.

In further embodiments, the zinc neutralized ethylene acid copolymer may have a density of at least 0.95 g/cc. The zinc neutralized ethylene acid copolymer may also have a melt index (MI) of 0.1 to 20 g/10 mins, or 0.5 to 10 g/10 mins, when measured in accordance to ASTM D-1238 at 210° C. at 2.16 kg Further, the zinc neutralized ethylene acid copolymer may have a melting point of at least 80° C. as measured by Differential Scanning Calorimetry (DSC). In further embodiments, the zinc neutralized ethylene acid copolymer may have a melting point of at least 85° C., or at least 90° C.

Additional Additives

The foam composition may optionally comprise about 0.0001 to about 50% by wt. (based on the total weight of the composition) of conventional additives used in polymeric materials including: plasticizers, stabilizers, antioxidants, ultraviolet ray absorbers, hydrolytic stabilizers, anti-static agents, dyes or pigments, fillers, fire-retardants, lubricants, reinforcing agents such as glass fiber and flakes, processing aids, antiblock agents, release agents, nucleating agents and/or mixtures thereof. In one embodiment the foam composition comprises 0.01 to 1 weight percent of antioxidants.

Foam

The present foam composition may have a shear viscosity ($v_{100}$) of greater than 500 Pa*s at a shear rate of 100 radians/second, greater than 750 Pa*s at a shear rate of 100 radians/second, greater than 1000 Pa*s at a shear rate of 100 radians/second, greater than 1500 Pa*s at a shear rate of 100 radians/second, or greater than 2000 Pa*s at a shear rate of 100 radians/second.

Moreover, the foam may have an expansion ratio of at least 200, at least 500%, at least 750%, at least 1000%, at least 1250%, at least 1500%, or at least 2000%. Furthermore, the foam may have a density of 0.02 to 0.5 g/cc, from 0.02 to 0.5 g/cc, or from 0.03 to 0.1 g/cc. As described in detail below, these low density foams are achievable by utilizing a physical foaming process.

The present polyamide foams can be used in multiple applications and articles. In various embodiments, the resulting polymer foam composition can used in light weight/temperature resistance parts for the automotive industry, thermal insulation materials for construction and packaging, rigid core materials for composites, etc.

Methods of Making

Various methods are considered suitable for mixing the polyamide and the ionomer. For example, the polyamide and ionomer can be fed into a suitable mixing device in solid form, such as for example in pellet form, to be blended Suitable mixing devices can be chosen among twin screw extruders with a mixing screw, Brabender-type mixers, internal mixers, Farrell continuous mixers or Buss Ko kneaders. In a specific embodiment, the mixing device is a twin screw extruder.

During the mixing step, the ionomer may be dispersed in the polyamide (which forms the continuous phase) as extremely fine particles which have a very narrow particle size distribution. After melt mixing, the blend is passed through the die of the extruder and then cut to yield solid particles of polyamide/ionomer blend, such as for example pellets.

The foam may be produced by a number of methods, such as compression molding, injection molding, and hybrids of extrusion and molding. The process can include mixing the components of the foam composition under heat to form a melt. The components may be mixed and blended using any technique known and used in the art, including Banbury, intensive mixers, two-roll mills, and extruders. Time, temperature, and shear rate can be regulated to ensure dispersion without premature crosslinking or foaming.

Foaming agents (also referred to as blowing agents) used in the manufacture of foams can be physical foaming agents or chemical foaming agents. As used herein, "physical foaming agents" are low-boiling liquids, which volatilize under the curing conditions to form the blowing gas. Exemplary physical foaming agents include hydrocarbons, fluorocarbons, hydrofluorocarbons, hydrofluoroolefins, hydrochlorofluoroolefins, and other halogenated compounds. In one or more embodiments, supercritical blowing agent comprising $CO_2$, $N_2$ or a combination of both may be included. In one embodiment, the supercritical $CO_2$ blowing agent may be utilized. As used herein, supercritical means at a temperature and pressure above the supercritical temperature and pressure of the blowing agent. For example, supercritical $CO_2$ blowing agent is above about 31° C. and above about 7.4 MPa.

In a chemical foaming process, chemical blowing agents, such as azodicarbonamide, are first mixed and dispersed in a molten polymer. Then at elevated pressure and temperature, the chemical blowing agent is decomposed to release gases, such as $N_2$ and $CO_2$ while azodicarbonamide case serves as blowing agent. For a chemical blowing agent, however, other byproducts are produced in addition to blowing agent gases. Without being bound by theory, chemical foaming agents may not be suitable in some instances to produce foams of low density, for example, foams of less than 0.1 g/cc.

Unlike chemical foaming agents, physical blowing agents under high pressure are directly metered into the plastic melt during foam extrusion or injection molded foaming. The byproduct issues associated with chemical foaming are not present with these physical foaming agents. Physically blowing agents may have advantages to form a more homogeneous foam structure, while being lower cost and more environmental sustainable especially for inorganic gas blowing agents, such as $N_2$ and $CO_2$. Also, physical blowing agents may be more preferred for producing lower density foam.

The following is an example process for adding physical blowing agent during extrusion foaming. Here, the pre-compounded polyamide and ionomer alloy is introduced into a feed hopper, flows through the barrel, and begins to melt. Physical blowing agent, for example, $CO_2$, is pumped from a cylinder and injected directly into the polymer melt for mixing to form a single-phase gas/polymer solution. Next, the solution may be transferred into a heat exchanger which provides cooling to suppress cell coalescence. Finally, the gas/polymer melt enters the extrusion die, and the foaming occurs because of sudden pressure drop.

Without being limited to theory, the sudden pressure drop induces phase separation of the gas and polymer melt to form the foam structure. In some instances, this can be a rapid pressure drop, for example from 15 to 30 MPa/sec.

The foam composition can further include a free radical initiator or crosslinking agents, co-curing agents, an activator, and any other type of additive typically used in similar compositions, including but not limited to pigments, adhesion promoters, fillers, nucleating agents, rubbers, stabilizers, and processing aids.

Free radical initiators or crosslinking agents can include, by way of example and not limitation, organic peroxides such as dialkyl organic peroxides. Example organic peroxides suitable for use include 1,1-di-t-butyl peroxy-3,3,5-trimethylcyclohexane, t-butyl-cumyl peroxide, dicumyl-peroxide, 2,5-dimethyl-2,5-di(tertiary-butyl-peroxyl)hexane, 1,3-bis(tertiary-butyl-peroxyl-isopropyl)benzene, or combinations of two or more thereof.

Co-curing agents include trimethyl propane triacrylate (and similar compounds), N,N-m-phenylenedimaleimide, triallyl cyanurate, or combinations of two or more thereof.

Activators may include activators for the blowing agent, and can include one or more metal oxides, metal salts, or organometallic complexes. Examples include ZnO. Zn stearate, MgO, or combinations of two or more thereof.

Testing Methods

Density of Ionomers

Density measurements were made in accordance with ASTM D792, Method B.

Melt Index ($I_2$) of Ionomers

Melt index (MI) was measured in accordance to ASTM D-1238 at 190° C. or at 210° C. at 2.16 kg. The values are reported in g/10 min, which corresponds to grams eluted per 10 minutes.

Shear Viscosity

The shear viscosity of the foams was characterized using a capillary rheometer at a temperature of 270° C. and a shear rate of 100 radians/second.

Foam Density

The foam density is measured according to ASTM D792

Expansion Ratio

For accurate calculation of the expansion ratio, you can measure the density before and after foaming. Expansion ratio (%)=plastic density (unfoamed)/density (post-foaming)*100.

Compressive Strength (MPa)

Compressive strength was determined according to ASTM D1621 at a compression rate of 1 mm/min. The compressive strength in MPa is the stress required to produce compression strain up to 15%.

Examples

The following examples are provided to illustrate various embodiments, but are not intended to limit the scope of the claims. All parts and percentages are by weight unless otherwise indicated. Approximate properties, characters, parameters, etc., are provided below with respect to various working examples, comparative examples, and the materials used in the working and comparative examples.

Further, a description of the raw materials used in the examples are listed in Table 1 below.

TABLE 1

| Material | Melting Point (° C.) | Density (g/cc) | Melt Index ($I_2$) g/10 mins |
|---|---|---|---|
| Ultramid ® B33L Polyamide (PA) 6 (BASF) | 220° | 1.12-1.15 | n/a |
| Inventive Ionomer (zinc neutralized) | 94° | 0.97 | 1.1* |
| Comparative ionomer (zinc neutralized) | 70° | 0.96 | 0.8** |

*measured at 210° C.
**measured at 190° C.

Referring to Table 1, the Inventive Ionomer is a Zn ionomer of an ethylene/methacrylic acid/maleic acid monoethyl ester (E/MAA/MAME) (83/11/6 wt. %) terpolymer with a Melt Index (MI) of 1.1 as measured at 210° C., where 50 mole % of the acid moieties are neutralized with Zn cation. The Comparative Ionomer is a Zn ionomer of an ethylene/n-butyl acrylate/methacrylic acid (68/23/9 wt. %) terpolymer with a MI of 0.8 as measured at 190° C., where 50 mole % of the acid moieties are neutralized with Zn cation.

Compounding

For Inventive Examples 1-5 listed below in Table 2, Ultramid® B33L PA 6 (produced by BASF), was dry blended at room temperature with inventive ionomer, and Irganox® 1098 phenolic antioxidant (produced by BASF), and then compounded using a Brabender twin-screw extruder at 240-250° C., followed by pelletizing in a separate pellizing unit. An independent super floater was utilized for dry blending. The Brabender twin-screw extruder, which had a temperature range of 240-250° C., included sequential temperature zones of 240° C./245° C./245° C./245° C./245° C./245° C.

Comparative Examples B and C were similarly prepared; however, comparative ionomer was used instead of inventive ionomer. Comparative Example A is a reference material comprising Ultramid® B33 L PA 6 and no ionomer.

Injection Molding

The pellets comprising the compositions of Inventive Examples 1-5 and Comparative Examples A-C were injected into a slab (7.5 mm*15 mm*5 mm) by injection molding using an Arburg 520C injection molding machine. The injection molding process was performed under the following process parameters: polymer melt temperature of 250° C.; mold temperature of 70° C.; pressure of 80 MPa; and injection speed of 5 mm/s.

Batch Foaming

The batch foaming process was performed in a high-pressure vessel. The injection molded slabs were placed in the vessel, and then $CO_2$ was injected into the vessel. The temperature and pressure of the vessel was 230° C. and 15 MPa, respectively, and was maintained for 30 min to saturate samples with the supercritical fluid $CO_2$. The foam structure was formed by a sudden pressure drop, which occurred in less than a second by a pressure vent having a diameter of 3 mm.

Characterization

The following tables 2 and 3 provide characterization data for the foams produced.

TABLE 2

PA/Ionomer Blends

| Example | Composition | % Ionomer | E (wt. %) | MAA (wt %) | MAME (wt %) | nBA (wt. %) | Foam Density (g/cm³) | % Expansion ratio | Shear Viscosity (Pa*s)at 100 s−1 |
|---|---|---|---|---|---|---|---|---|---|
| Inventive example 1 | Inventive ionomer/PA 6 | 3 | 83 | 11 | 6 | — | 0.115 | 1000% | 553.13 |
| Inventive example 2 | Inventive ionomer/PA 6 | 6 | 83 | 11 | 6 |  | 0.075 | 1500% | 922.59 |
| Inventive example 3 | Inventive ionomer/PA 6 | 10 | 83 | 11 | 6 |  | 0.045 | 2500% | 1356.35 |
| Inventive example 4 | Inventive ionomer/PA 6 | 20 | 83 | 11 | 6 |  | 0.045 | 2500% | 2442.50 |
| Inventive example 5 | Inventive ionomer/PA 6 | 40 | 83 | 11 | 6 |  | 0.450 | 250% | 1618.01 |
| Comparative example A | PA 6 | 0 |  | n/a | n/a |  | 0.800 | <100% | 222.14 |
| Comparative Example B | Comparative ionomer/PA 6 | 10 | 68 | 9 |  | 23 | 0.450 | 250% | 475.38 |
| Comparative example C | Comparative ionomer/PA 6 | 20 | 68 | 9 |  | 23 | 0.115 | 1000% | 567.25 |

TABLE 3

| Composition |  | % Ionomer | Expansion ratio (%) | Compressive strength (MPa) (Compressive strain 15%) |
|---|---|---|---|---|
| Inventive Example 1 | Inventive Ionomer/PA 6 | 3 | 750 | 1.8 |
| Comparative example C | Comparative Ionomer/PA 6 | 20 | 750 | 0.4 |

As shown from Table 2, Inventive Examples 1-5 all have a shear viscosity of greater than 500 Pa*s at 100 s$^{-1}$, whereas Comparative Examples A and B are both below 500 Pa*s at 100 s$^{-1}$. While Inventive Example 1 and Comparative Example C have comparable shear viscosity values as shown in Table 2, the compressive strength of Inventive Example 1 is at least 4 times greater than Comparative Example C as shown in Table 3.

Finally, referring to Table 2, the Inventive Examples 2-4 demonstrated much higher shear viscosity values and lower density values than the Comparative Examples.

Moreover. Comparative Example A, which only includes PA 6, only achieved an expansion ratio well below 100%. However, after blending with ionomer, much higher expansion ratios were achieved.

It should be apparent to those skilled in the art that various modifications can be made to the described embodiments without departing from the spirit and scope of the claimed subject matter. Thus, it is intended that the specification cover modifications and variations of the described embodiments provided such modification and variations come within the scope of the appended claims and their equivalents.

The invention claimed is:

1. A foam comprising:
    55 to 98 wt. % polyamide; and
    2 to 45 wt. % of ionomer consisting of a zinc neutralized ethylene acid copolymer,
        wherein the zinc neutralized ethylene acid copolymer is the polymerized reaction product of ethylene monomer, monocarboxylic acid monomer, and unsaturated dicarboxylic acid monomer, and
        wherein 30 to 70 mole percent of total acid units of the ionomer are neutralized;
    wherein a foam structure of the foam is formed by a pressure drop from 15 to 30 MPa/sec, within a second.

2. The foam of claim 1, wherein the foam has a density of 0.03 to 0.5 g/cc.

3. The foam of claim 1, wherein the foam has an expansion ratio of at least 1500%.

4. The foam of claim 1, wherein the foam is free of polyurethane.

5. The foam of claim 1, wherein the foam comprises 75 to 97 wt. % polyamide.

6. The foam of claim 1, wherein the polyamide comprises aliphatic polyamide.

7. The foam of claim 1, wherein the polyamide comprise PA 6, PA 11, PA 12, or combinations thereof.

8. The foam of claim 1, wherein the foam comprises 3 to 20 wt. % ionomer.

9. The foam of claim 1, wherein the zinc neutralized ethylene acid copolymer comprises at least 50% ethylene monomer, based on the total wt. % of the monomers present in the zinc neutralized ethylene acid copolymer.

10. The foam of claim 1, wherein the zinc neutralized ethylene acid copolymer comprises at least 5 to 25 wt. % of monocarboxylic acid monomer, based on the total wt. % of the monomers present in the zinc neutralized ethylene acid copolymer.

11. The foam of claim 1, wherein the zinc neutralized ethylene acid copolymer comprises 2 to 20 wt. % of unsaturated dicarboxylic acid monomer, based on the total wt. % of the monomers present in the zinc neutralized ethylene acid copolymer.

12. The foam of claim 1, wherein the unsaturated dicarboxylic acid monomer comprises maleic anhydride, maleic anhydride mono-methyl ester, maleic anhydride mono-ethyl ester, maleic anhydride mono-propyl ester, maleic anhydride mono-butyl ester, or combinations thereof.

13. The foam of claim 1, wherein the monocarboxylic acid monomer comprises methacrylic acid, acrylic acid, or combinations thereof.

14. A method of producing foam comprising:
    injecting supercritical blowing agent of $CO_2$, $N_2$ or a combination of both into a vessel to mix with a foam precursor mixture, wherein the vessel is at a pressure and temperature above the supercritical temperature and pressure of the blowing agent, and wherein the foam precursor mixture comprises 55 to 98 wt. % polyamide; and 2 to 45 wt. % of ionomer consisting of a zinc neutralized ethylene acid copolymer,
        wherein the zinc neutralized ethylene acid copolymer is the polymerized reaction product of ethylene monomer, monocarboxylic acid monomer, and unsaturated dicarboxylic acid monomer, and
        wherein 30 to 70 mole percent of total acid units of the ionomer are neutralized;
    producing the foam by dropping the pressure below the pressure of the supercritical blowing agent at a pressure drop from 15 to 30 MPa/sec within a second.

15. The foam of claim 1, wherein
    the foam has a density of 0.03 to 0.5 g/cc, and
    the foam has an expansion ratio of at least 1500%.

16. The foam of claim 15, wherein the foam is free of polyurethane.

17. The foam of claim 16, wherein the foam comprises 75 to 97 wt. % polyamide.

18. The foam of claim 1, wherein the foam comprises a foam composition comprising a melt shear viscosity ($v_{100}$) of greater than 500 Pa*s at a shear rate of 100 radians/second and at a temperature of 270° C.

19. The foam of claim 1, wherein the monocarboxylic acid monomer is maleic anhydride mono-methyl ester.

* * * * *